US008635417B2

(12) United States Patent  
Morrison et al.

(10) Patent No.: US 8,635,417 B2
(45) Date of Patent: Jan. 21, 2014

(54) MEMORY SYSTEM INCLUDING VARIABLE WRITE COMMAND SCHEDULING

(75) Inventors: Michael J. Morrison, Sunnyvale, CA (US); Jay B. Patel, Los Gatos, CA (US)

(73) Assignee: MoSys, Inc., Santa Clara, CA (US)

( * ) Notice: Subject to any disclaimer, the term of this patent is extended or adjusted under 35 U.S.C. 154(b) by 0 days.

(21) Appl. No.: 13/468,850

(22) Filed: May 10, 2012

(65) Prior Publication Data

US 2012/0254558 A1  Oct. 4, 2012

Related U.S. Application Data

(63) Continuation of application No. 13/077,261, filed on Mar. 31, 2011.

(51) Int. Cl.
*G06F 13/00* (2006.01)
*G06F 13/28* (2006.01)
*G06F 12/00* (2006.01)

(52) U.S. Cl.
USPC .......... 711/154; 711/104; 711/E12.001

(58) Field of Classification Search
None
See application file for complete search history.

(56) References Cited

U.S. PATENT DOCUMENTS

| | | | |
|---|---|---|---|
| 5,930,359 A | 7/1999 | Kempke | |
| 6,279,051 B1 | 8/2001 | Gates | |
| 7,139,860 B2 | 11/2006 | Walker | |
| 7,558,270 B1 | 7/2009 | Wilford | |
| 7,631,313 B2 | 12/2009 | Mayhew | |
| 7,873,066 B2 | 1/2011 | Muff | |
| 8,069,327 B2 * | 11/2011 | Subashchandrabose et al. ............ | 711/167 |
| 8,099,523 B2 | 1/2012 | Ajanovic | |
| 8,170,035 B2 | 5/2012 | Furey | |
| 8,416,770 B2 * | 4/2013 | Fourcand ............ | 370/352 |
| 2001/0030943 A1 | 10/2001 | Gregg | |
| 2005/0273564 A1 | 12/2005 | Lakshmanamurthy | |
| 2006/0067370 A1 | 3/2006 | Yang | |
| 2007/0189232 A1 | 8/2007 | Chang | |
| 2008/0059748 A1 | 3/2008 | Klint | |
| 2008/0177940 A1 | 7/2008 | Risse | |
| 2009/0172260 A1 | 7/2009 | Olbrich | |
| 2009/0198847 A1 | 8/2009 | Norman | |
| 2010/0005212 A1 | 1/2010 | Gower | |
| 2010/0122021 A1 | 5/2010 | Lee | |
| 2010/0185808 A1 | 7/2010 | Yu | |
| 2010/0306458 A1 | 12/2010 | Aho | |
| 2011/0060546 A1 | 3/2011 | Miller | |
| 2011/0074552 A1 * | 3/2011 | Norair et al. ............ | 340/10.1 |
| 2011/0261840 A1 | 10/2011 | Baptist | |

FOREIGN PATENT DOCUMENTS

EP    0697664    2/1996

OTHER PUBLICATIONS

Search report in European application No. 12162499.3-1229 dated Jul. 13, 2012.

* cited by examiner

*Primary Examiner* — Reginald Bragdon
*Assistant Examiner* — Eric S Cardwell
(74) *Attorney, Agent, or Firm* — MHKKG

(57) ABSTRACT

A system includes a host device that may be configured to initiate memory requests to a system memory. The system also includes a memory controller that may be configured receive the memory requests and to format the memory requests into memory transactions that are conveyed to the memory device via a memory interface. The memory transactions include a plurality of memory write command types. Each memory write command type corresponds to a different respective schedule for conveying a corresponding data payload.

28 Claims, 5 Drawing Sheets

200 ↘

| 79 | 44 | 43 | 8 | 7 | 6 | 5 | 0 |
|---|---|---|---|---|---|---|---|
| L Command Slot | | R Command Slot | | TL=1 | A | CRC | |

| 79 | 44 | 43 | | 8 | 7 | 6 | 5 | 0 |
|---|---|---|---|---|---|---|---|---|
| Read Opcode | Address | R Command Slot | | | TL=1 | A | CRC | |

FIG. 3

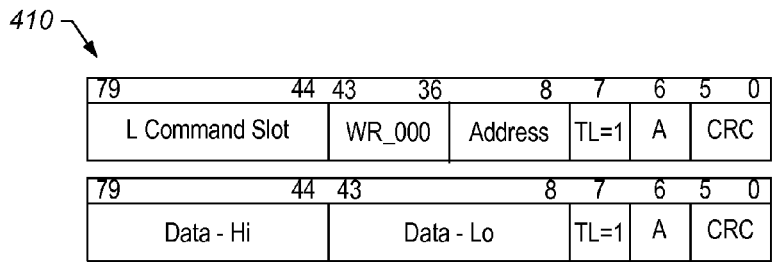
FIG. 4A
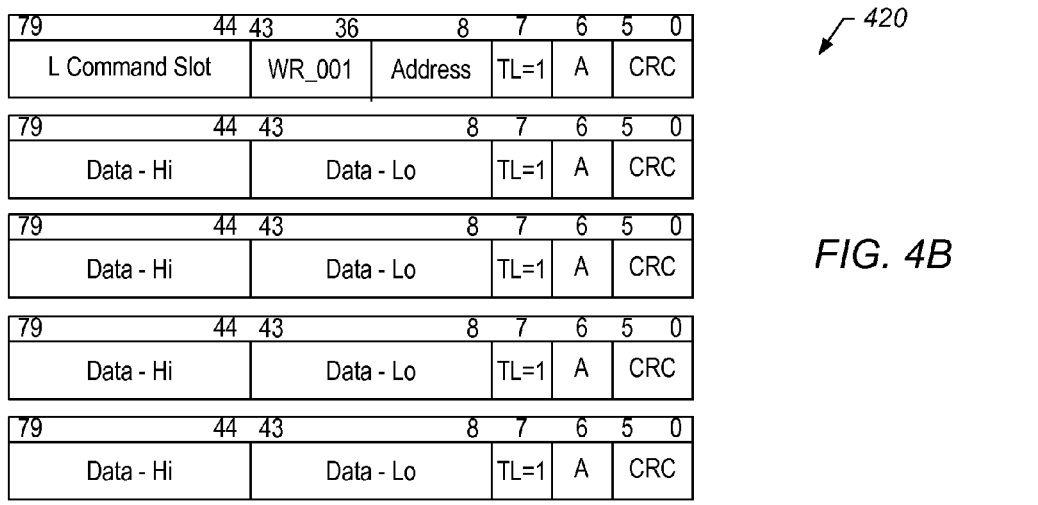
FIG. 4B
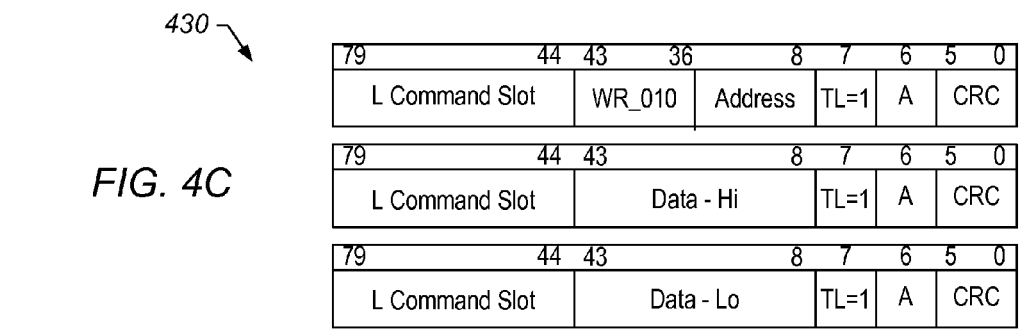
FIG. 4C
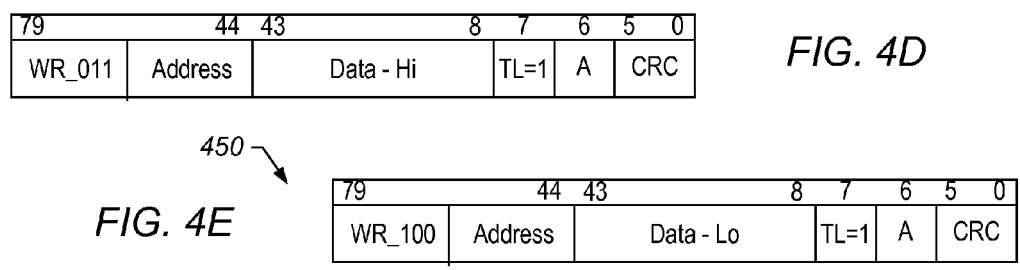
FIG. 4D
FIG. 4E

MEMORY SYSTEM INCLUDING VARIABLE WRITE COMMAND SCHEDULING

PRIORITY INFORMATION

This application is a continuation of co-pending U.S. patent application Ser. No. 13/077,261 entitled "Memory System Including Variable Write Command Scheduling" filed Mar. 31, 2011.

BACKGROUND

1. Technical Field

This disclosure relates to memory systems, and more particularly to memory command scheduling on a memory interface.

2. Description of the Related Art

In many computer systems, a memory device may be read from and written to using a variety of conventional memory interfaces and protocols. For example, in some conventional protocols, separate channels may exist for transmitting a memory command, the address, and the associated write data. Bandwidth may be allocated to each of these channels based on the bandwidth need for the respective channel. This type of interface may have drawbacks. More particularly, bandwidth may be lost on some of the channels since some of the channels will not need nearly as much bandwidth as other channels. Some conventional memory protocols may have additional drawbacks. For example, the data for a write command may only be sent at a specific time relative to the write command. This type of command and data scheduling may also limit bandwidth, depending on when and how many read commands or other commands may be concurrently pending.

SUMMARY OF THE EMBODIMENTS

Various embodiments of memory system including variable write command scheduling are disclosed. In one embodiment, a memory subsystem includes a memory device and a control unit. The memory device may include one or more memory arrays for storing data. The control unit may be configured to read and write the data to the one or more memory arrays in response to receiving memory transactions. The memory transactions include a number of memory write command types. However, each memory write command type corresponds to a different schedule for conveying a corresponding data payload.

In one particular implementation, each memory transaction includes at least one frame having a first command slot and a second command slot. In addition, one of the memory write command types includes a first frame, a second frame, and a third frame. The first frame includes a corresponding memory write command positioned in one of the first or the second command slots. The second frame conveys a first portion of the corresponding data payload, and the third frame conveys a remaining portion of the corresponding data payload.

In another particular implementation, one of the memory write command types includes a first frame and a second frame. The first frame includes a corresponding memory write command positioned in one of the first or the second command slots. The second frame conveys a first portion of the corresponding data payload in the first command slot and a remaining portion of the corresponding data payload in the second command slot.

In another embodiment, a system includes a host device that may be configured to initiate memory requests to a system memory. The system also includes a memory controller that may be configured receive the memory requests and to format the memory requests into memory transactions that are conveyed to the memory device via a memory interface. The memory transactions include a plurality of memory write command types. Each memory write command type corresponds to a different respective schedule for conveying a corresponding data payload.

BRIEF DESCRIPTION OF THE DRAWINGS

FIG. 2 is a diagram depicting one embodiment of a non-specific memory transaction frame.

FIG. 3 is a diagram depicting one embodiment of a memory read transaction.

FIG. 4A is a diagram depicting one embodiment of a memory write transaction.

FIG. 4B is a diagram depicting one embodiment of a burst memory write transaction including five frames.

FIG. 4C is a diagram depicting another embodiment of a memory write transaction.

FIG. 4D is a diagram depicting another embodiment of a memory write transaction.

FIG. 4E is a diagram depicting another embodiment of a memory write transaction.

Figure 1:
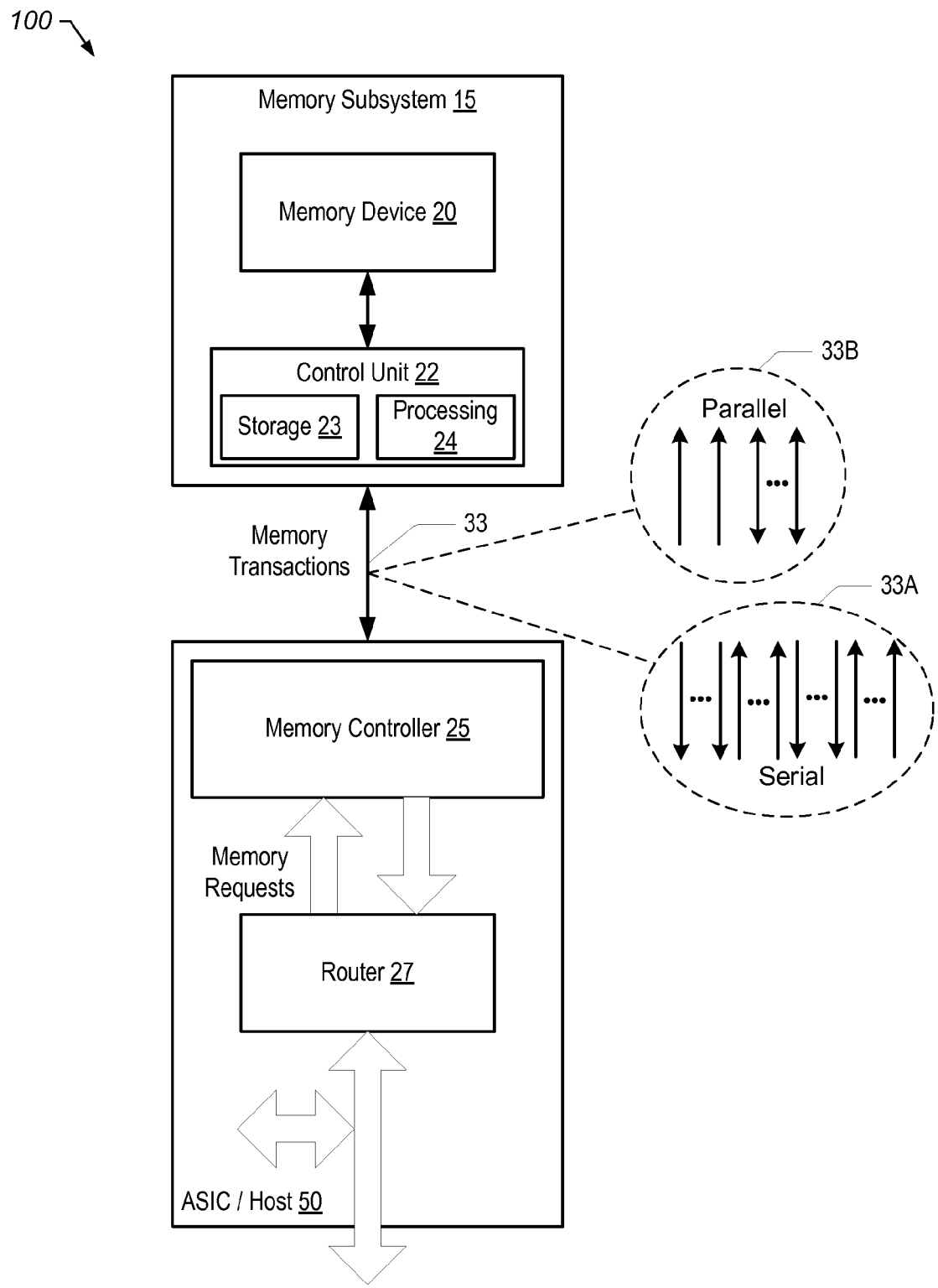
FIG. 1 is a block diagram of one embodiment of system including a memory subsystem.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION OF THE EMBODIMENTS

Turning now to FIG. 1, a block diagram of one embodiment of a system including a memory subsystem is shown. The system 100 includes an application specific integrated circuit (ASIC)/host 50 coupled to a memory subsystem 15 via an interface 33. In the illustrated embodiment, the ASIC/host 50 includes a router 27 coupled to a memory controller 25. The memory subsystem 15 includes a control unit 22 coupled to a memory device 20.

In one embodiment, the ASIC/host 50 may receive memory requests from internal or external sources. The router 27 may forward the memory requests to the memory controller 25. The memory controller 25 may format the memory requests into memory transactions suitable for transmission on interface 33 to memory subsystem 15. In various embodiments, the memory transactions may include memory write transactions, memory read transactions, and memory read-modify-write (RMW) transactions. As shown in FIG. 2 through FIG. 5, the memory transactions may be formatted into 80-bit frames, although other numbers of bits are possible and contemplated. In one embodiment, the frames may be used at the transaction layer.

As described further below in conjunction with the description of FIG. 4A through FIG. 4D, the memory write transactions may include a number of different types of write commands. More particularly, the memory controller 25 may be configured to format the memory write transactions to take advantage of the bandwidth available on interface 33 by using different types of write commands that have different data payload scheduling.

In FIG. 1, control unit 22 may receive the memory transactions from the memory controller 25, decode the different command opcodes, reformat the transactions and send them to memory device 20. Therefore, control unit 22 may be configured to control the operation of, and the sending and receiving of data to memory device 20. As shown, control unit 22 includes a storage unit 23. In one embodiment, storage unit 23 may store a number of base addresses that may be used during the read-modify-write operations. As described in greater detail below in conjunction with the description of FIG. 5 and FIG. 6, the base addresses may be written using a special write frame. In addition, the processing unit 24 of control unit 22 is configured to perform a number of logical and arithmetic functions on data read from memory device 20 as part of the modify phase of a read-modify-write (RMW) memory transactions.

In various embodiments, interface 33 may be a serial interconnect or a parallel interconnect, depending on the specific implementation. In serial interconnect implementations (e.g. 33A), interface 33 may include one or more serial channels. Each channel may include one or more unidirectional or bi-directional communication lanes. In implementations with a single serial lane, a given frame may be sent serially in a single bitstream across the lane. However, in implementations that include multiple lanes per channel, the 80-bit frame may be transmitted across one or more of the lanes in a given channel. In parallel implementations (e.g., 33B), interface 33 may include a number of unidirectional command and address signal paths and a number of bidirectional data signal paths that make up a parallel bus, and the 80-bit frame may be transmitted in a traditional parallel format across the parallel bus. It is noted that in implementations that use a serial interface for interface 33, memory controller 25 may concurrently send on different channels of interface 33 various different memory transactions.

Memory device 20 may include one or more memory arrays for storing data. For example, in one particular implementation, the one or more memory arrays of memory device 20 may be implemented using 1T-SRAM cells. In one embodiment, memory device 20 and control unit 22 may be coupled via a parallel interconnect, although it is contemplated that in other embodiments any interconnect may be used. In addition, memory device 20 and control unit 22 may be implemented on the same integrated circuit (IC) die. Furthermore, in one embodiment, memory subsystem 15 and ASIC/host 50 may also be implemented on the same IC die.

As described further below, the memory controller 25 may take advantage of the different types of memory transactions to improve bandwidth. More particularly, by using different types of memory read and write transactions, various memory write transactions and memory read transactions may be combined and, depending on how much data needs to be read from or written to memory device 20, memory controller 25 may choose the different ones of the memory read and write commands at different times.

Turning to FIG. 2, a diagram depicting one embodiment of a non-specific memory transaction frame is shown. The frame 200 is an 80-bit frame that includes a number of fields. As shown in the illustrated embodiment, the frame 200 includes a cyclic redundancy code (CRC) field in bits zero through five. Bit six corresponds to an acknowledge bit 'A', while bit seven corresponds to a transaction layer field (TL) in which an encoding of one indicates the frame is a transaction layer frame. Bits eight through 43 correspond to one command slot, designated here as the R (i.e. right) command slot, and bits 44 through 79 correspond to another command slot, designated here as the L (i.e. left) command slot. As described further below, each of the L and R command slots may contain information corresponding to a read command, a write command, a RMW command, or data depending on what information is in the frame or the preceding frame. In various embodiments, either one or both command slots of a frame may be used in a given transaction.

Referring to FIG. 3, a diagram depicting one embodiment of a memory read transaction is shown. The read frame 300 includes a read command opcode and an address. As shown, the read command opcode and address are positioned in the L command slot of the read frame 300. As shown, the R command slot is empty. However, in other embodiments, two read commands may be issued in one frame. As such both the L and R command slots would include a read command opcode and an associated address. In addition, as described further below, a read command may be issued in one command slot (e.g., the L command slot), and a write command may be included in the other command slot.

In various embodiments, there may be a number of different read opcodes, each specifying a different type of read transaction. For example, in one embodiment one read opcode may specify a read operation of the data at the address specified in the read frame. Thus, that read opcode may indicate to control unit 22 of FIG. 1 to perform a read operation at the specified address. In another embodiment, a different read opcode may specify a burst read operation of a particular length, and the address in the read transaction may be the starting address of the burst.

Turning now to FIG. 4A, a diagram depicting one embodiment of a memory write transaction including two frames is shown. Similar to the read transaction frame in FIG. 3, the first bits 0-7 of the top frame of write transaction 410 include CRC bits and various control bits such as transaction layer indication bits. In the illustrated embodiment, the L command slot is empty, while the R command slot includes a write command opcode and an address. However, in the bottom frame the data for the above write command is transmitted in bits 8-79, thereby providing a data payload of 72 bits. It is noted that the top frame may be referred to as the command frame and the bottom frame may be referred to as the data frame. In the data frame, the data payload is broken up into Data Hi and Data Lo, where the Data Hi is transmitted in bits 44-79 (e.g., L command slot) and Data Lo is transmitted in bits 8-43 (e.g., R command slot). As mentioned above, since the L command slot of the command frame is empty in this embodiment, it is noted that a read command may be placed into the L command slot. As shown, the write command WR_000 corresponds to a particular opcode encoding that indicates to the control unit 22 of FIG. 1 that the entire 72-bit data payload for this write command will follow in the next frame.

Referring to FIG. 4B, a diagram depicting one embodiment of a burst memory write transaction including five frames is shown. In the illustrated embodiment, the top frame of write transaction 420 is the command frame. The command frame in FIG. 4B is similar to the command frame in FIG. 4A; however, the opcode encoding is different for this write command. More particularly, in FIG. 4B the write command opcode is encoded as WR_001. In one embodiment, the WR_001 opcode indicates to the control unit 22 of FIG. 1 that there will be four subsequent data payload frames after the command frame, each of which include 72-bit data payloads. It is noted that although four subsequent data payload frames are shown in FIG. 4B, it is contemplated that in other embodiments, different numbers of data payload frames may be issued by the memory controller 25 of FIG. 1. Similar to the command frame shown in FIG. 4A and as noted above, the L command slot is empty. However, the L command slot may include a non-write command such as a read or other command, for example. In one embodiment, control unit 22 upon receiving a command frame having a read command in the L command slot may process the read command first and then the write command.

Referring now to FIG. 4C, a diagram depicting one embodiment of a memory write transaction including three frames is shown. In the illustrated embodiment, the command frame of write transaction 430 is similar to the command frame shown in FIG. 4B and FIG. 4A. However, in the write transaction 430, the write command opcode is encoded as WR_010. Accordingly, in one embodiment, such an encoding indicates to the control unit 22 that the data payload will be transmitted in the next two subsequent frames, one 36-bit half word at a time. However, as shown in FIG. 4C, the Data Hi half word is transmitted in the next subsequent frame while the Data Lo half word is transmitted in the second subsequent frame. Again in all three frames of transaction 430 the L command slot is empty. However, as noted above, a non-write command could be inserted in each of these L command slots. Accordingly, memory controller 25 may take advantage of the available bandwidth by inserting commands such as read commands, for example, into each of these frames.

Referring now to FIG. 4D, a diagram depicting another embodiment of a write transaction is shown. In the illustrated embodiment, transaction 440 includes one frame that includes a write command opcode in the L command slot and a data payload in the R command slot. As shown, the write command is encoded as WR_011. In the illustrated embodiment, the data payload is sent as a half word. More particularly, the Data Hi half word is sent in the R command slot. Thus, the write opcode WR_011 indicates to the control unit 22 that only the upper half word of a 72-bit data payload is being transmitted in the current frame.

Referring to FIG. 4E, a diagram depicting another embodiment of a write transaction is shown. Similar to the transaction 440 of FIG. 4D, transaction 450 of FIG. 4E includes one frame that includes a write command opcode in the L command slot and a data payload in the R command slot. However in FIG. 4E, the write opcode is encoded as WR_100. In the embodiment of FIG. 4E, the data payload is also sent as a half word. More particularly, the Data Lo half word is sent in the R command slot. Thus, the write opcode WR_100 indicates to the control unit 22 that only the lower half word of a 72-bit data payload is being transmitted in the current frame.

In one embodiment, the transactions shown in FIGS. 4D and 4E may be used together or separately, as desired. Accordingly, from the above embodiments shown in FIG. 4A-FIG. 4E, memory controller 25 may best use the bandwidth available by using a variety of different types of write commands.

In another embodiment, half word write transactions may be performed in additional ways. More particularly, memory controller 25 may use additional write opcodes to perform half word writes, where the write opcode may specify which of the upper or lower half word is being sent. In one embodiment, the write command may be sent in the R command slot and that the half word of data will be sent in either the R command slot or the L command slot of the next frame. In such an embodiment, the write opcode may specify whether the data payload is the Data Hi or Data Lo half word and which of the R command slot or the L command slot the data will occupy.

Figure 5:
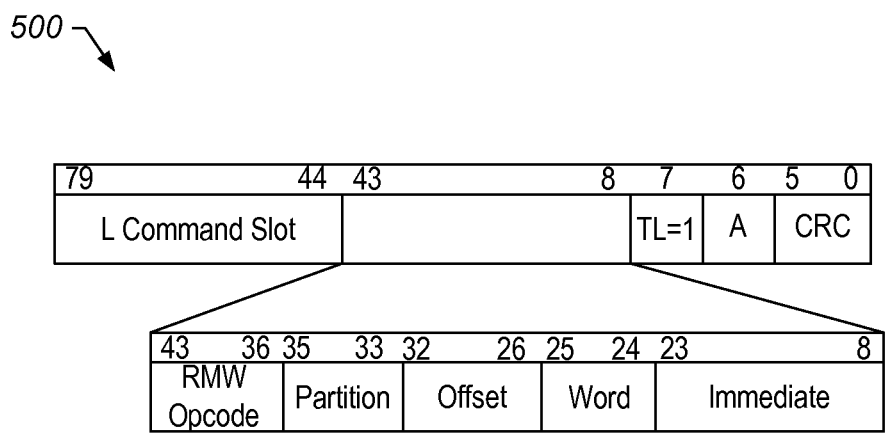
FIG. 5 is a diagram depicting one embodiment of a memory read-modify-write transaction.

Turning to FIG. 5, a diagram depicting one embodiment of a read-modify-write transaction including one frame is shown. Similar to the read transaction frame in FIG. 3 and the write transaction frames of FIG. 4A-FIG. 4E, the first bits 0-7 of the top frame of RMW transaction 500 include CRC bits and various control bits such as transaction layer indication bits. In the illustrated embodiment, the L command slot is empty, while the R command slot includes a RMW command opcode. However, rather than just an address in the address field as in the read and write command frames, the RMW addressing is different. In the embodiment shown in FIG. 5, bits eight through 35 include a 16-bit immediate operand, bits 24-25 include a two-bit Word encoding, bits 26 through 32 include a seven-bit offset, and bits 33-35 include a three-bit partition encoding.

In the system 100 of FIG. 1, a RMW transaction may allow memory data to be modified with a minimum number of memory transactions being sent across interface 33. For example, a single RMW transaction sent across interface 33 may allow the data at a particular address to be modified. Memory addresses may be given as offsets relative to a base address that may be preloaded into the storage 23 of FIG. 1.

In one embodiment, the RMW modify operations include 16, 32, and 64-bit arithmetic logic unit (ALU) operations that include addition and subtraction operations such as saturating addition subtraction and modulo $2^n$ addition and subtraction. In addition, the following logical operations may also be performed: AND, OR and exclusive-OR (XOR). Further, various other arithmetic or logical operations such as shifts, compares, increment, decrement, and the like, may be performed. Each of these different types of RMW operations may have a corresponding RMW command opcode encoding. In one embodiment, the control unit 22 may include processing functionality 24 to perform these operations, among others.

Referring back to FIG. 5, in one embodiment, each of the RMW commands performs an operation between the 16-bit immediate operand in bits [23:8] of the frame with a 16, 32 or 64-bit operand stored at an address in the memory device 20 as specified by the RMW opcode. Once the memory operand has been modified, the control unit 22 writes the result back to the memory device. The memory address may be computed by combining (e.g., ADD, XOR, etc) the offset field (e.g., bits

[32:26]) with the base address previously loaded into the storage 23. The partition field (e.g., bits [35:33]) may select one of the base addresses that may be stored within storage 23. The size and alignment of the data may be determined by the RMW opcode in combination with the Word field. More particularly, for 16 and 32-bit RMW commands, the Word value may determine which bits of the memory operand is the data, while for 64-bit RMW commands, the Word field is ignored since the data is implied to be all 64 bits.

In another embodiment, one or more additional RMW opcodes may specify variable data sizes to be operated on. More particularly, one RMW opcode may specify two different and independent operations to be performed on two different portions of a memory operand. For example, one such RMW opcode may specify that one portion of the memory operand will be 40 bits and the other portion is 24 bits. In addition, the same RMW opcode may specify that the control unit 22 will perform one operation such as an increment or decrement, for example, on the 24-bit portion, and another operation such as an XOR with the 16-bit immediate operand of the frame, for example on the 40-bit portion. Thus, with one RMW opcode, two independent operations may be performed on two different portions of data (same or different sized) from a memory operand. It is noted that any operation, described above, that may be performed on a memory operand may be performed on both portions.

As mentioned above, storage 23 may hold a number of write base addresses in a number of storage locations. Memory controller 25 may load the memory base addresses into storage 23 using a write base command frame that may be similar to the frames shown in FIG. 3-FIG. 5. More particularly in one embodiment, a write base command frame may include a write base command in either command slot of a standard frame. The write base command may include a write base opcode, a base address and a partition. Upon receiving a write base command frame, control unit 22 may write the base address in the frame into one of the storage locations.

Figure 6:
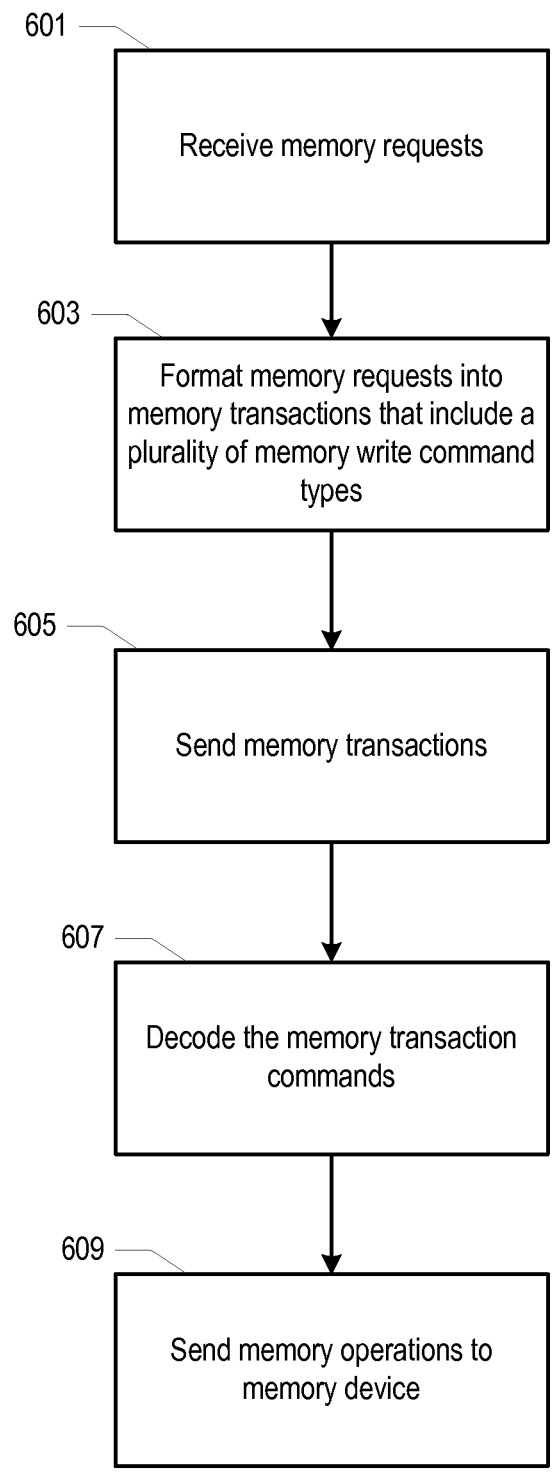
FIG. 6 is a flow diagram describing the operation of an embodiment of the system shown in FIG. 1.

Turning to FIG. 6, a flow diagram describing the operation of an embodiment of the system of FIG. 1 is shown. Beginning in block 601, the memory controller 25 receives memory requests from the router 27. The memory controller 25 formats the memory requests into memory transactions (block 603). As described above, depending on the bandwidth available and other factors, memory controller 25 may use any of the memory write commands to write data to the memory device 20. More particularly, as shown in the preceding figures and described above, if there are a number of read and write requests outstanding for example, memory controller 25 may utilize the scheduling variability of the write commands as well as the ability to include a read command in the same command frame. Alternatively, if there is a burst of data, memory controller 25 may utilize the memory write burst command as shown in FIG. 2B. As described above, one or more write, read, and/or RMW frames may formatted at the transaction layer.

Once the memory transactions have been formatted, memory controller 25 may transmit the memory transactions to the memory subsystem 15 via the interface 33 (block 605). The formatted frames may be sent via a physical layer upon the interface 33.

Upon receipt of the memory transaction commands, control unit 22 decodes the commands in each of the frames (block 607). Once a command is decoded, control unit 22 may reformat the command and send it to the memory device 20 (block 609). More particularly, in the case of a write command, control unit 22 may send the data to an address in the memory device 20. In the case of a read command, control unit may perform a read operation on memory device 20, and when the requested data is returned by memory device 20, control unit 22 may send the requested data back to memory controller 25. However, in the case of a RMW command, the control unit 22 may perform a read operation of a particular memory address as calculated by the control unit 22 from the information in the RMW frame. Control unit 22 may then modify the read data as specified in the RMW opcode, and then write the modified data back to the address in memory device 20.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A memory subsystem, comprising:
a memory device including one or more memory arrays for storing data; and
a control unit coupled to the memory device and configured to read the data from and to write the data to the one or more memory arrays in response to receiving memory transactions via a memory interface;
wherein each of the memory transactions includes at least one frame having a plurality of command slots for conveying memory commands;
wherein the memory transactions include a plurality of memory write command types, wherein each memory write command type corresponds to a different schedule for conveying an associated data payload; and
wherein each memory command includes an opcode, and wherein the opcode of a given memory write command specifies which of one or more frames subsequent to the given memory write command convey the associated data payload, and a quantity of the associated data payload.

2. The memory subsystem as recited in claim 1, wherein the plurality of command slots of a given frame is configured to convey a plurality of different commands.

3. The memory subsystem as recited in claim 1, wherein each memory transaction includes at least one frame having a first command slot and a second command slot.

4. The memory subsystem as recited in claim 3, wherein one of the plurality of memory write command types comprises a single frame that includes a corresponding memory write command positioned in one of the first or the second command slots and a portion of the data payload in the remaining command slot.

5. The memory subsystem as recited in claim 3, wherein one of the plurality of memory write command types comprises a first frame that includes a corresponding memory write command positioned in one of the first or the second command slots, and a second frame that conveys a first portion of the corresponding data payload in the first command slot and a remaining portion of the corresponding data payload in the second command slot.

6. The memory subsystem as recited in claim 3, wherein one of the plurality of memory write command types comprises a first frame that includes a corresponding memory write command positioned in one of the first or the second command slots, a second frame that conveys a first portion of the corresponding data payload, and a third frame that conveys a remaining portion of the corresponding data payload.

7. The memory subsystem as recited in claim 3, wherein one of the plurality of memory write command types comprises a first frame that includes a corresponding memory write command positioned in one of the first or the second command slots, a plurality of subsequent frames corresponding to a data burst, wherein each of the plurality of subsequent frames is configured to convey a first portion of the corresponding data payload in the first command slot and a remaining portion of the corresponding data payload in the second command slot, and wherein a remaining command slot of the first frame is available to convey another memory command.

8. The memory subsystem as recited in claim 1, wherein a given memory transaction includes a plurality of frames configured to convey a memory write command and data, and wherein at least one command slot in each frame is available to convey other memory commands.

9. The memory subsystem as recited in claim 1, wherein the memory transactions further include a memory read command type, and wherein a given memory transaction includes a first frame including a memory read command positioned in one of the first or the second command slots, and a memory write command positioned in the remaining command slot, and at least one additional frame that conveys at least a portion of the corresponding data payload.

10. The memory subsystem as recited in claim 1, wherein the memory interface comprises a serial interconnect having a single lane.

11. The memory subsystem as recited in claim 10, wherein the single lane is configured to convey the given memory transaction in a single bitstream.

12. The memory subsystem as recited in claim 1, wherein the memory interface comprises a serial interconnect having a plurality of lanes.

13. The memory subsystem as recited in claim 1, wherein a given frame comprises the memory write command opcode, a write address, and write data.

14. The memory subsystem as recited in claim 1, wherein the opcode specifies which portion of each of the one or more frames subsequent to the given memory write command convey the associated data payload.

15. A memory system, comprising:
a host device configured to initiate memory requests to a system memory; and
a memory controller coupled to the host device and configured to receive the memory requests and to format the memory requests into memory transactions that are conveyed to the system memory device via a memory interface;
wherein each of the memory transactions includes at least one frame having a plurality of command slots for conveying memory commands;
wherein a given frame is configured to convey one or more command types in the plurality of command slots;
wherein the one or more command types includes a plurality of memory write command types, wherein each memory write command type corresponds to a different schedule for conveying an associated data payload; and
wherein each memory command includes an opcode, and wherein the opcode of a given memory write command specifies which of one or more frames subsequent to the given memory write command convey the associated data payload, and a quantity of the associated data payload.

16. The memory system as recited in claim 15, wherein the memory controller is further configured to format one of the plurality of memory write command types to include a single frame that includes a corresponding memory write command positioned in one of a first command slot or a second command slot, and a portion of the data payload in the remaining command slot.

17. The memory system as recited in claim 15, wherein the memory controller is further configured to format one of the plurality of memory write command types to include a first frame that includes a corresponding memory write command positioned in one of a first command slot or a second command slot, and a second frame that conveys a first portion of the corresponding data payload in the first command slot and a remaining portion of the corresponding data payload in the second command slot.

18. The memory system as recited in claim 15, wherein the memory controller is further configured to format one of the plurality of memory write command types to include a first frame that includes a corresponding memory write command positioned in one of a first command slot or a second command slot, a second frame that conveys a first portion of the corresponding data payload, and a third frame that conveys a remaining portion of the corresponding data payload.

19. The memory system as recited in claim 15, wherein the memory controller is further configured to format one of the plurality of memory write command types as a write burst command, wherein a write burst command comprises a first frame that includes a corresponding memory write command positioned in one of a first command slot or a second command slot, and one or more subsequent frames, each including a first command slot and a second command slot, and wherein each subsequent frame includes a first portion of the corresponding data payload in the first command slot and any remaining portion of the corresponding data payload in the second command slot.

20. The memory system as recited in claim 15, wherein the memory transactions further include a memory read command type, and wherein the memory controller is further configured to format the first frame of the write burst command to include a read command positioned in the remaining command slot.

21. The memory system as recited in claim 15, wherein the memory transactions further include a memory read command type, and wherein the memory controller is further configured to format a given frame to include a memory write command and a memory read command.

22. The memory system as recited in claim 15, wherein the memory controller is further configured to fill all of the command slots to increase bandwidth utilization of the memory interface.

23. The memory system as recited in claim 22, wherein the memory controller is further configured to fill all of the command slots with the one or more command types.

24. The memory system as recited in claim 15, wherein a given frame corresponds to a given memory transaction overhead, wherein each of the plurality of command slots shares the transaction overhead.

25. The memory system as recited in claim 24, wherein the memory controller is further configured to include one of a command or data payload in each of the command slots to increase bandwidth utilization of the memory interface.

26. A method comprising:
receiving memory requests to read and write data to a system memory;
formatting the memory requests into memory transactions; and
sending the memory transactions to the system memory;
wherein each of the memory transactions includes at least one frame having a plurality of command slots;
conveying one or more command types in the plurality of command slots of a given frame;
wherein the one or more command types includes a plurality of memory write command types, wherein each memory write command type corresponds to a different schedule for conveying an associated data payload; and wherein each memory command includes an opcode, and wherein the opcode of a given memory write command specifies which of one or more frames subsequent to the given memory write command convey the associated data payload, and a quantity of the associated data payload.

27. The method as recited in claim 26, wherein the sending memory transactions to the system memory further comprises conveying the given memory transaction in a single bitstream on a memory interface comprising a serial interconnect having a single lane.

28. The method as recited in claim 26, wherein the opcode specifies which portion of each of the one or more frames subsequent to the given memory write command convey the associated data payload.

* * * * *